(12) United States Patent
Kuzmich et al.

(10) Patent No.: US 7,043,051 B2
(45) Date of Patent: May 9, 2006

(54) PROPRIETARY WATERMARK SYSTEM FOR SECURE DIGITAL MEDIA AND CONTENT DISTRIBUTION

(75) Inventors: Vsevolod M. Kuzmich, St. Petersburg (RU); Igor O. Ivanov, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 968 days.

(21) Appl. No.: 10/078,273

(22) Filed: Feb. 20, 2002

(65) Prior Publication Data

US 2002/0122567 A1 Sep. 5, 2002

Related U.S. Application Data

(60) Provisional application No. 60/269,863, filed on Feb. 21, 2001.

(51) Int. Cl.
*G06K 9/00* (2006.01)

(52) U.S. Cl. .................... 382/100; 716/176; 380/55

(58) Field of Classification Search ............... 382/100; 713/176, 181; 380/55, 202, 203; 705/57; 707/9–10
See application file for complete search history.

(56) References Cited

U.S. PATENT DOCUMENTS

| | | | |
|---|---|---|---|
| 6,741,991 B1 * | 5/2004 | Saito | 707/9 |
| 6,891,958 B1 * | 5/2005 | Kirovski et al. | 382/100 |
| 2002/0191809 A1 * | 12/2002 | Kirovski et al. | 382/100 |
| 2003/0048922 A1 * | 3/2003 | Rhoads | 382/100 |
| 2004/0034781 A1 * | 2/2004 | Natarajan | 713/181 |
| 2004/0059936 A1 * | 3/2004 | Wakao et al. | 713/200 |
| 2004/0131184 A1 * | 7/2004 | Wu et al. | 380/202 |
| 2005/0018873 A1 * | 1/2005 | Rhoads | 382/100 |
| 2005/0058318 A1 * | 3/2005 | Rhoads | 382/100 |
| 2005/0097333 A1 * | 5/2005 | Kirovski et al. | 713/176 |
| 2005/0097334 A1 * | 5/2005 | Kirovski et al. | 713/176 |
| 2005/0196013 A1 * | 9/2005 | Rhoads | 382/100 |

* cited by examiner

*Primary Examiner*—Barry Choobin
(74) *Attorney, Agent, or Firm*—Fleshner & Kim, LLP

(57) ABSTRACT

A copyright protection method for digital media is disclosed. The present invention is designed to solve the problems of the existing media protection systems and to satisfy all of media owners, distributors, and consumers. The copyright protection method according to the present invention can be applied to any type of digital media and makes no assumptions on any particular media properties. The method employs symmetric and asymmetric cryptographic protection techniques as well as a digital watermarking method. Cryptography is used to provide the security of the copyright information access for media managers. Digital watermarking is used to modify the played or recorded media signals to keep track a list of involved playing devices in order to detect any illegal copy maker and to identify any legal copy from illegal copies.

20 Claims, 2 Drawing Sheets

PROPRIETARY WATERMARK SYSTEM FOR SECURE DIGITAL MEDIA AND CONTENT DISTRIBUTION

CROSS-REFERENCE TO RELATED APPLICATIONS

This application claims the benefit of U.S. Provisional Application No. 60/269,863, filed on Feb. 21, 2001, in the name of inventors Vsevolod M. Kuzmich and Igor O. Ivanov, titled "Propriety Watermark System for Secure Digital Media and Content Distribution", which is hereby incorporated by reference as if fully set forth herein.

BACKGROUND OF THE INVENTION

1. Field of the Invention

The present invention relates to media protection systems, and more particularly, to a digital media/content protection system that provides the protection of the media owner's copyright during a media/content distribution process using cryptographic and watermarking techniques.

2. Discussion of the Related Art

In today's digital world, there is a great wealth of information that can be accessed in various forms: text, image, audio, and video. The relationships within the digital content triangle, "Owner, Distributor, and Customer" have become more and more complicated. The electronic representation and transfer of the digital media and content have increased the potential for any misuse and theft of such information and have significantly increased the problems associated with the enforcement of the copyright protection of such information.

These problems are rooted from the intrinsic features of the digital information: making copies of the information is easy and inexpensive, each copy is identical to the original (no quality loss), and the distribution of the copies is easy and fast. For these reasons, the authors and publishers of multimedia materials fear providing their works in the multimedia services and are seeking the solutions that can eliminate the problems associated with the copyright protection of the multimedia data. Thus, to preserve the digital media originality and to provide the security and copyright of the media, their distribution became a very important issue. There are two major techniques that are involved when providing a protection of the digital media: cryptography and digital watermarking.

Cryptography is a technology that is widely used for providing the data security. Relating to digital media, cryptography is used to provide the security of the access to copyright information access among the media managers in the Owner-Distributor-Consumer triangle. There are two main classes of cryptographic systems: symmetric key and public key (asymmetric key) encryption systems. A hybrid cryptographic system is a system in which both classes of systems are combined.

In a symmetric key encryption system, a single key can be used both to encrypt and decrypt. There are several efficient implementations of the symmetric key systems, but their key management is often troublesome.

In a public key encryption system, the processes of the data encryption and decryption are independent from each other. The data encryption process employs a public key, while the data decryption process requires a different (but mathematically related) private key. Knowing of the public key allows the encryption of a plaintext but does not allow the decryption of a ciphertext: the private key is necessary for the ciphertext decryption. A key owner keeps his private key secrete so that he is the only person who can decrypt a encrypted ciphertext and sign the digital data using his private key. If the key owner publishes his public key, then anyone can use that key to encrypt messages for the key owner and to verify the owner signature.

In a hybrid cryptographic system, a plaintext is encrypted with a symmetric algorithm having a symmetric key. The symmetric key itself is encrypted with a public-key algorithm having a public key. The encrypted symmetric key and data are then delivered to a recipient, who uses his private key to decrypt the symmetric key and uses the decrypted key to decrypt the data. This process is considerably faster than a public key encryption system, and it allows using a different symmetric key each time, considerably enhancing the security of the symmetric algorithm. Thus, the hybrid cryptographic system is ideal for transferring the protected media to a user.

Digital watermarking is a technology that is used for embedding copyright information data into various forms of media such as image, audio, and video with a minimum amount of perceivable degradation of the "host" signal. The embedded data should be invisible and inaudible to a human observer. The digital watermarking technology is often used to modify the played and recorded media signals and to keep track of a list of the involved playing or recording devices in order to detect any illegal copy maker. Using the technology, one can distinguish legal media from the illegal media copies. The purpose of embedding the copyright information into the digital media is to provide a proof of the copyright and assurance of the content integrity. Therefore, the embedded data should stay stable in a host signal even if the host signal is processed. Such a hidden and stable data, securely placed into a "host" signal to store the essential supplementary information, is called a watermark.

A watermarking process includes three basic stages: generating a watermark, embedding the watermark, and detecting the watermark. A watermark belongs to one owner who is the only person who can proceed to prove the ownership of the host signal.

SUMMARY OF THE INVENTION

Accordingly, the present invention is directed to a copyright protection method for digital media in a media distribution process.

An object of the present invention is to provide a copyright protection method for digital media/content that (1) properly protects the copyrights of the media content owner, (2) reliably preserves and proves the originality of the digital media, and (3) provides the security of the media/content distribution process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a first copyright protection method for digital media includes embedding a secrete watermark into an original media content, the secrete watermark being generated with a secrete key of a content owner and representing an authorization signature of the owner; embedding a first public watermark into the secrete watermark-embedded media content, the first public watermark being generated with a first private key of the owner and certifying a first copyright of the owner; and embedding a second public watermark into the first public watermark-embedded media content, the second public watermark being generated with a second private key of a content distributor and certifying a second copyright of the distributor.

In another aspect of the present invention, a second copyright method for digital media includes embedding a secrete watermark into an original media content, the secrete watermark being generated with a secrete key of a content owner and representing an authorization signature of the owner; embedding a first public watermark into the secrete watermark-embedded media content, the first public watermark being generated with a first private key of the owner and certifying a first copyright of the owner; embedding an informational watermark into the first public watermark-embedded media content, the informational watermark including additional information related to the original content; and embedding a second public watermark into the informational watermark-embedded media content, the second public watermark being generated with a second private key of a content distributor and certifying a second copyright of the distributor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention relates to a copyright protection method of the digital media and the digital content distribution. It is applicable to all types of media, and the principles of the present invention may be extended by one having ordinary skill in the art to any new types. The present invention offers a high-level protection to multimedia right owners. It further offers a use of three subjects of digital media distribution process: a content owner, a content distributor, and a content consumer.

First of all, the content owner is a subject who produces and owns an original media copy (original content). The content owner can distribute the copies of the original content and certify his copyright by digitally signing the copies. Second, the content distributor is a subject who receives the copies of the original content from the content owner and has a right to redistribute the copies to one or more consumers or to other distributors. The content distributor can also certify his copyright by digitally signing the distributed content. Lastly, the content consumer is a subject who receives the copies of the original content from the content owner or content distributor for his or her personal use.

When a copyright owner signs the digital media materials produced, it is essential to choose a proper technique for digital content signing. One of the ways of signing a digital content is digital watermarking. Digital watermarking allows keeping the indelible marks within the media data, and these marks could be used to indicate the owner's copyright. The copyright must be distributed with the media content to indicate the content owner's right. The present invention offers to store the copyright data in the form of a digital watermark into the content. Each owner of the copy of the content can add his or her own watermark as an owner data indicating his or her copyright corresponding to the content.

Figure 1:
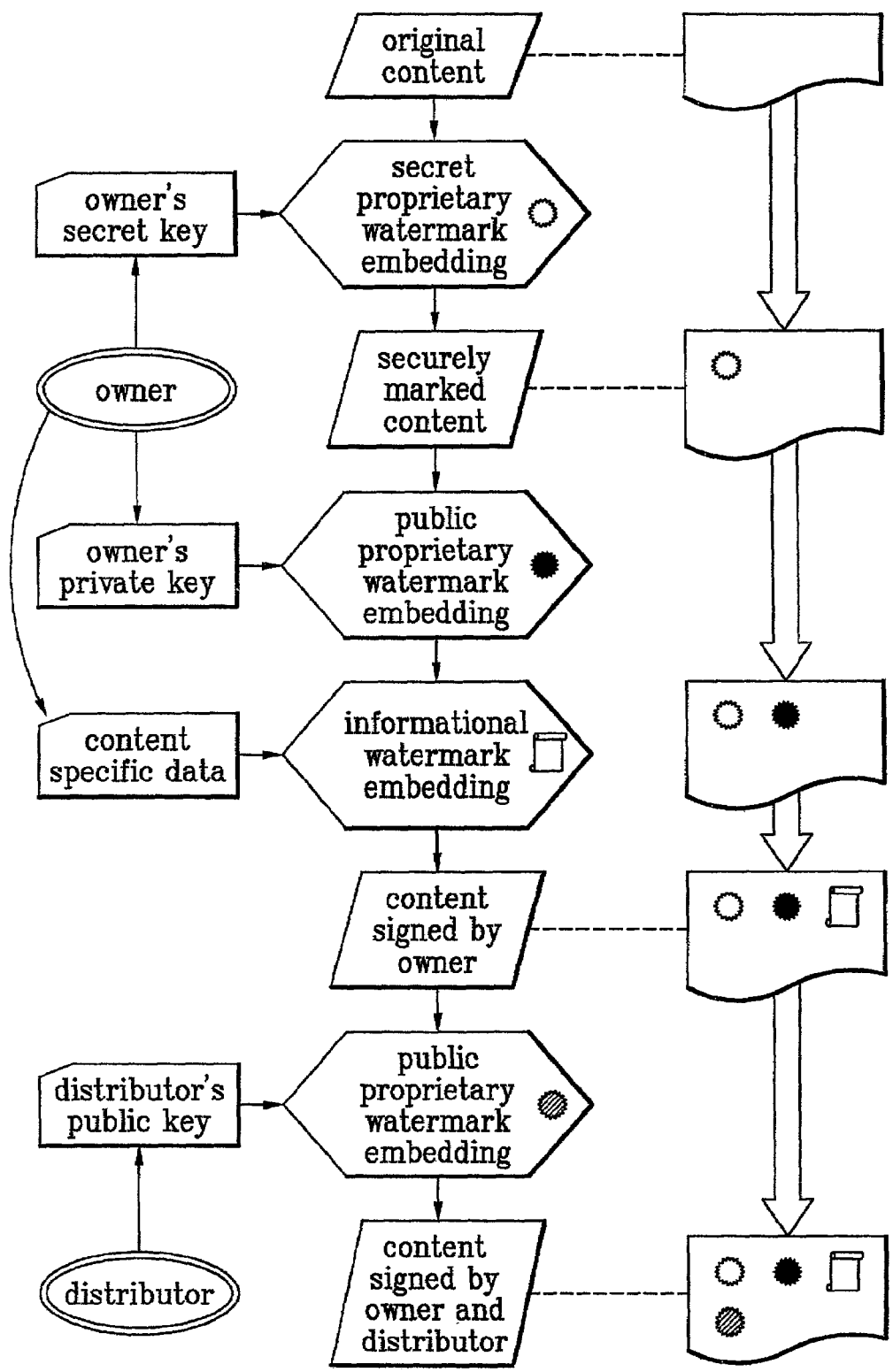
FIG. 1 is a flow chart illustrating the copyright protection method according to the present invention.

The present invention offers three ways to protect the copyright of digital media during the digital media distribution in accordance with a secrecy level: secrete, public, and informational proprietary copyright protection schemes. A copyright protection method of the present invention is illustrated in FIG. 1. The system shown in FIG. 1 employs a combination of all of three schemes and can be used for the security level assignment among the content distribution participants. As mentioned above, the main parts of the content distribution participants are a content owner, a content distributor, and a content consumer.

The content owner adds a secrete watermark (owner secrete watermark) into an original media content using his own secrete key. The secrete watermark represents an owner authorization signature for the media content. This watermark can be distinguished only by the secrete key owner. Then, the content owner adds a public watermark (owner public watermark) that allows to certify the owner' right and to check it by any third party, who has an owner public key (public key 1). Additionally, the content owner adds an informational watermark that allows to store additional content information (content properties) within the media content. Anyone can read this information without any access key by using a special software tool.

After the content preparation processes described above are perfomred, the content owner hands the owner-watermarked content over to the content distributor. Then the content distributor adds his own public watermark (distributor public watermark) into the owner-watermarked content that allows to certify his copyright and to check it by any third party, who has a distributor public key (public key 2). The consumer can get an informational watermark without any key and any public watermark by using a corresponding public key.

Figure 2:
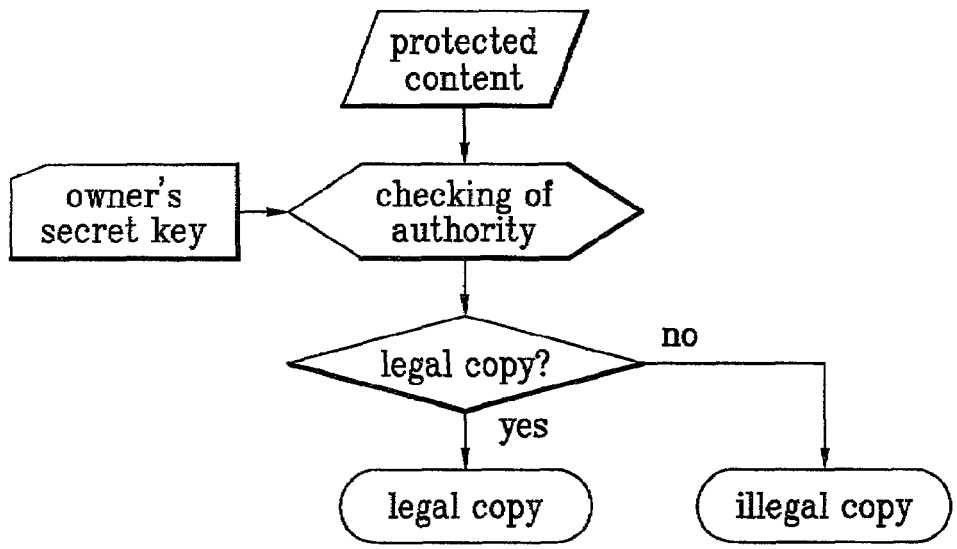
FIG. 2 is a flow chart illustrating a method of verifying the validity of a media content by using a secrete proprietary watermarking technique according to the present invention.

FIG. 2 is a flow chart illustrating a method of verifying the validity of a media content by using the secrete proprietary watermarking technique according to the present invention. The secrete proprietary copyright protection scheme is based on the symmetric cryptography (using a secrete key) and digital watermarking principles. Secrete proprietary watermarks can be used as the authentication and content integrity mechanisms in a variety of ways. This implies that the watermark is a secured link and readable only by the authorized persons having the secrete key, which was used to generate the watermark. Removing this type of watermark should be possible with a heavy degradation of the carrier signal. In order to detect this type of watermark, a secrete key and an owner identification (ID) must be known. Thus, only a content owner who knows the secrete key and owner ID is able to operate with a secrete proprietary watermark. The main goals of the method shown in FIG. 1 are as follows:

Distinguish the presence of the watermark within the content and illicit copying disclosure Conserve ancillary owner information within watermarked content Protect owner information embedded into the content from unauthorized access and modifications The requirements of the secrete proprietary copyright protection security are as follows:

An appropriate symmetric key cryptography algorithm must be used.

A digital watermarking technique that provides robust watermark embedding and detection must be used.

It must be possible to authenticate a watermark message with only the watermarked content, the secrete watermarking key, and the owner ID.

Authentication or the failure to authentication of the watermark message must survive the subsequent encoding with the same or other watermarking process.

A digital watermarking system should be implementable by an individual content creator, where authentication of the watermarked content is possible by any third party.

In a digitized form, the content should only be distributed with watermarks if the watermarks are expected to provide authentication.

This scheme assumes that the owner of the content has to specify some information for the watermarking process. The first part of the data is Delimiter generated on the basis of the owner ID. It allows to divide the different content owners' or redistributors' watermarks from each other. The second part of the data is owner data that the owner wants to associate with the current copy of the content. This is an information part of the watermark. The third part of the data is an owner secrete key (So) that is used as a basis of the symmetric cryptographic scheme protecting the watermark data itself from the illegal use.

A copyright protection apparatus compounds the watermark from the mentioned parts of the data in a manner that different content owners or redistributors have the different watermarks. The next step is to code each informational bit of the watermark according to the selected watermarking technique and embedding the obtained signal into the content. The owner ID is used to detect the watermark within the watermarked content. In a case of successful detection, the owner secrete key (So) must be produced to encode the watermark and obtain the plain owner data.

Figure 3:
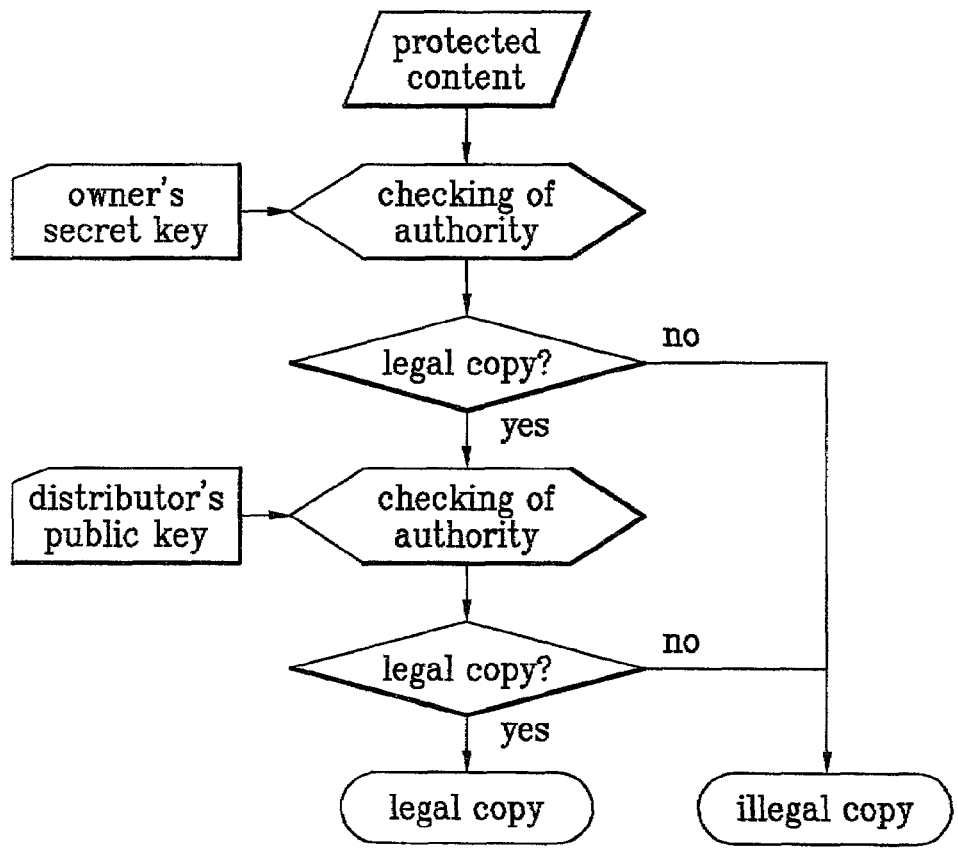
FIG. 3 is a flow chart illustrating a method of verifying the validity of a media content by using a public proprietary watermarking technique according to the present invention.

FIG. 3 is a flow chart illustrating a method of verifying the validity of a media content by using a public proprietary watermarking technique according to the present invention. The public proprietary copyright protection method is based on the public key cryptographic principles. By the definition, the public copyright protection embeds a traditional copyright notice into a signal with an owner private key. It is expected that the owner officially publishes the corresponding public key so that anyone can read it and check the watermark. Although the public copyright protection is bit less secure that secrete one, it is much more difficult to remove a visible/audible label. Moreover, the failure of the public watermark detection indicates that the signal has been significantly tampered, and the user can be informed of the alteration.

The main goals of the method shown in FIG. 2 are as follows:

Distinguish the presence of the watermark within the content

Conserve ancillary owner information (possibly including content properties) within the watermarked content Protect the owner information embedded into the content from any unauthorized access and modifications Provide any third party (having the public key) with an opportunity to get the content properties.

The requirements of the public copyright protection security are as follows:

An appropriate symmetric-key cryptographic algorithm much be selected.

A digital watermarking technique that provides the robust watermark embedding and detection must be selected.

It must be possible to authenticate a watermark message with only the watermarked content, the public key and the owner ID.

Authentication or a failure to authenticate of the watermark message must survive the subsequent encoding with the same or other watermarking processes.

A digital watermarking system should be implemented by an individual content creator, where the authentication of the watermarked content can be done by any third party In a digitized form, the content should only be distributed with watermarks if the watermarks are expected to provide the authentication.

The public proprietary copyright protection shown in FIG. 3 assumes that the owner of the content has to specify some information for watermarking forming. The first part of the data is delimiter generated on the basis of the owner identification (ID). It allows to divide the different content owners' or distributors' watermarks from each other. The second part if owner data that the owner wants to associate with the current copy of the content. This is an informational part of the watermark. The third part of the data is an owner public key (Po) that is used as a basis of an asymmetric cryptography scheme protecting the plain owner data itself from the illegal use.

The copyright protection system compounds the watermark from the mentioned parts of data in a manner that different content owners or redistributors have the different watermarks. The next steps are to code each informational bit of the watermark according to a selected watermarking technique and to embed the obtained signal into the content.

The owner ID and owner public key (Po) are used to detect the watermark within the watermarked content, and in a case of successful detection, the owner public key (Po) is used to encode the watermark and to obtain the plain owner data. The owner public key (Po) and owner ID have to be passed to the content distributor or another content owner, and anyone who received the key can select and view the data that are concerned to the corresponding content owner or distributor.

The informational copyright protection scheme according to the present invention acts as an information carrier with the watermark readable to anyone. These watermarks are detectable by a third party using a special embedded tool of a media player (e.g., a Properties button). The informational watermarks mainly act as information links. Therefore, these links do not need to fulfill the same security constraints as the watermarks formed in the secrete copyright protection schemes. The information copyright protection scheme allows free validity detection: it does not need an original media data and any secrete key to determine the presence of a watermark.

The main goals of the scheme are to distinguish the presence of the watermark within the content and to inform a customer about the content owner and content properties (e.g., title, artist, date, version, media parameters such as bit-rate, and etc.).

Some of the requirements of the informational copyright protection security are as follows:
- An appropriate symmetric key cryptographic algorithm must be selected.
- A digital watermarking technique that provides the robust watermark embedding and detection must be selected.
- It must be possible to authenticate a watermark message with the watermarked content by using a special software module.
- A digital watermarking system should be implementable by an individual content creator, where the authentication of the watermarked content can be done by any third party.
- In a digitized form, the content should be distributed only with the watermarks if the watermarks are expected to provide authentication.

This scheme assumes that the content owner needs to specify some information for a public use. So, it is possible to associate the information with the content using a watermarking technique without any cryptographic features. This information is related rather to the content itself than the content owner. No key is necessary to find and read the information.

If a content owner wants to redistribute the original content to a content distributor or another content owner with all the copyrights related to the content, it is possible to set Trusted Relationships between two parties. It means that the content owner has to pass his secrete key and owner ID to another party, e.g., by using a hybrid cryptographic scheme.

For confidentiality purposes, the message is (symmetrically) encrypted with a randomly generated session key, and this session key is encrypted with the public key of a receiver. This public-key-encrypted session key is sent along with the encrypted (symmetrical) message to the receiver. Then the receiver uses his private key to find the session key and decrypts the message using the found session key. By signing a short digest (hash) instead of the whole message, the integrity can be efficiently realized by a hybrid system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A copyright protection method for digital media, the method comprising the steps of:
    embedding a secret watermark into an original media content, said secret watermark being generated with a secrete key of a content owner and representing an authorization signature of said owner;
    embedding a first public watermark into said secret watermark-embedded media content, said first public watermark being generated with a first private key of said owner and certifying a first copyright of said owner; and
    embedding a second public watermark into said first public watermark-embedded media content, said second public watermark being generated with a second private key of a content distributor and certifying a second copyright of the distributor.

2. The method of claim 1, further comprising the steps of:
    extracting said secret watermark from said second public watermark-embedded media content; and
    decrypting said extracted watermark with said secrete key.

3. The method of claim 1, further comprising the steps of:
    extracting said first public watermark from said second public watermark-embedded media content; and
    decrypting said extracted watermark with a first public key corresponding to said first private key in order to obtain said first copyright.

4. The method of claim 3, wherein said first public key is published by said content owner.

5. The method of claim 1, further comprising the steps of:
    extracting said second public watermark from said second public watermark-embedded media content; and
    decrypting said extracted watermark with a second public key corresponding to said second private key in order to obtain said second copyright.

6. The method of claim 5, wherein said second public key is published by said content distributor.

7. The method of claim 1, wherein said secret watermark is readable by any third party having said secrete key.

8. The method of claim 1, wherein said first public watermark is readable by any third party having a first public key which corresponds to said first private key and is published by said content owner.

9. The method of claim 1, wherein said second public watermark is readable by any third party having a second public key which corresponds to said second private key and is published by said content distributor.

10. A copyright protection method for digital media, the method comprising the steps of:
    embedding a secret watermark into an original media content, said secret watermark being generated with a secret key of a content owner and representing an authorization signature of said owner;
    embedding a first public watermark into said secret watermark-embedded media content, said first public watermark being generated with a first private key of said owner and certifying a first copyright of said owner;
    embedding an informational watermark into said first public watermark-embedded media content, said informational watermark including additional information related to said original content; and
    embedding a second public watermark into said informational watermark-embedded media content, said second public watermark being generated with a second private key of a content distributor and certifying a second copyright of said distributor.

11. The method of claim 10, further comprising the steps of:
    extracting said secrete watermark from said second public watermark-embedded media content; and
    decrypting said extracted watermark with said secret key.

12. The method of claim 10, further comprising the steps of:
   extracting said first public watermark from said second public watermark-embedded media content; and
   decrypting said extracted watermark with a first public key corresponding to said first private key in order to obtain said first copyright.

13. The method of claim 12, wherein said first public key is published by said content owner.

14. The method of claim 10, further comprising the steps of:
   extracting said informational watermark from said second public watermark-embedded media content; and
   extracting said additional information from said extracted watermark.

15. The method of claim 10, further comprising the steps of:
   extracting said second public watermark from said second public watermark-embedded media content; and
   decrypting said extracted watermark with a second public key corresponding to said second private key in order to obtain said second copyright.

16. The method of claim 15, wherein said second public key is published by said content distributor.

17. The method of claim 10, wherein said secret watermark is readable by any third party having said secrete key.

18. The method of claim 10, wherein said first public watermark is readable by any third party having a first public key which corresponds to said first private key and is published by said content owner.

19. The method of claim 10, wherein said informational watermark is readable by any third party without any key.

20. The method of claim 10, wherein said second public watermark is readable by any third party having a second public key which corresponds to said second private key and is published by said content distributor.

* * * * *